United States Patent [19]

Silvester

[11] Patent Number: 4,666,411
[45] Date of Patent: May 19, 1987

[54] THRUST AUGMENTER

[76] Inventor: Richard Silvester, 132 Essex Street, Wembley, Australia

[21] Appl. No.: 768,481

[22] PCT Filed: Aug. 7, 1984

[86] PCT No.: PCT/AU84/00152
§ 371 Date: Jul. 3, 1985
§ 102(e) Date: Jul. 3, 1985

[87] PCT Pub. No.: WO86/01174
PCT Pub. Date: Feb. 27, 1986

[51] Int. Cl.$^4$ ............................................. B63H 1/28
[52] U.S. Cl. ............................................. 440/66; 440/67
[58] Field of Search .................... 440/66, 67; 114/151, 114/166; 239/265.19

[56] References Cited

U.S. PATENT DOCUMENTS

| 803,671 | 11/1905 | Curtis | 440/66 |
| 2,030,375 | 2/1936 | Kort | 440/67 |
| 2,275,618 | 4/1942 | Edwards | 440/67 X |
| 3,710,748 | 1/1973 | Baer et al. | 114/151 |
| 4,106,425 | 8/1978 | Gruber | 440/67 |
| 4,309,172 | 1/1982 | Narita et al. | 440/67 |

FOREIGN PATENT DOCUMENTS 8100514  8/1982  Netherlands ............ 440/66

Primary Examiner—Joseph F. Peters, Jr.
Assistant Examiner—Paul E. Salmon
Attorney, Agent, or Firm—Fleit, Jacobson, Cohn & Price

[57] ABSTRACT

A thrust augmenter for a propeller fluid drive (11) comprising a hollow substantially cylindrical body (12) having an open rear face (15) which is part circular or circular and is located closely adjacent and ahead of the propeller (11) wherein the outside diameter of the rear face (15) is larger than the propeller (11).

7 Claims, 3 Drawing Figures

THRUST AUGMENTER

This invention relates to a thrust augmenter for propeller driven vessels which utilises a wake generator.

Propulsion of objects such as ships is achieved by jetting a stream of fluid to the rear. The force involved in the momentum change is conveyed to the vehicle generating it to effect its propulsion. The jet stream is normally effected by a propeller which accelerates fluid approaching it due to the forward motion of the vessel. As speed increases so the change in momentum is reduced.

Some water reaching the propeller is in the wake of the vessel and hence it is travelling in the direction of movement of the vessel at some proportion of its forward speed. The change in momentum effected by the propeller of the water in the wake of the vessel is then increased so improving the efficiency of propulsion and this improvement is known as a "wake factor". Increasing the wake of a hull however causes high velocities on its stern to produce a rearwards force which negates in part the gain from the wake augmentation of the propeller. As a result the velocities and pressures of water reaching the propeller are not uniform over its circular orbit.

It is an object of the present invention to provide a thrust augmenter by generating a more uniform wake just forward of the propeller for fast moving vessels.

In one form the invention resides in a thrust augmenter for a propeller fluid drive comprising a substantially cylindrical hollow body having an open rear face which is substantially circular or partially circular and is located closely adjacent and ahead of the propeller wherein the outside diameter of the rear face is larger than the propeller.

If a wake is generated by the construction of a hollow body of almost circular cross-section just forward of the propeller with the spacing between the propeller and the rearward extremity of this wake generator being a fraction of the propeller diameter, the wake water reaching the propeller can be moving forward at almost the same speed of the vessel and the velocity of water arriving at the propeller is evenly distributed over its orbit.

According to a preferred feature of the invention the forward end of the body is streamlined to reduce fluid drag as a result of its forward motion.

According to a preferred feature of the invention the forward end of the body is formed with at least one opening to provide for limited fluid flow between the interior and exterior of the body.

According to a preferred feature of the previous feature said openings have closures movable in relation to the openings to vary the degree of opening.

According to a preferred feature the thrust augmenter is mounted to a keel or keel like structure from which the propeller extends rearwardly said thrust augmenter comprising one or more portions fixed to the keel or keel like structure.

According to a preferred feature of the previous feature the forward end of the body is formed with openings to each side of the keel or keel like structure and associated with hinged gates associated with a drive means capable of varying the degree of opening of said gates said gates being openable outwards and being inclined to the hull to reduce forward form drag.

According to a preferred feature of the invention said drive means comprises a fluid activated cylinder mounted to the keel and having its piston connected to the gates by a shaft.

If the gates at the forward end of the wake generator are partially opened water will arrive at the propeller with reduced but evenly distributed velocity at the propeller. At slow forward speeds the gates would be more open than at higher speeds when approach velocities to the propeller need to be reduced.

According to a further preferred feature at least a portion of the inner wall of the body has a diameter of significantly less than the outside diameter the body and the outer end of said inner wall diverges outwardly to define a flared entrance to the body at said rear face.

In the case of propeller reversal for backing or stopping the vessel the closures or gates at the forward end of the wake generator are fully opened. The jet stream from the propeller discharges forwards through the cylindrical chamber of the wake augmenter and drives extra water through its rearward entrances. This flow causes a rearward force as it passes around the flared opening which is additional to that of the reversing propeller itself.

According to a further preferred feature of the invention radial vanes are mounted to the periphery of the rear face to direct water flowing into the space between the body and propeller in a direction opposite to the propeller rotation.

To reduce vorticity losses in propulsion by the propeller, the vanes attached to the rear face provide a reversed swirl to the water reaching the propeller. The twist in these vanes is both radial and axial to cater for flow from around the augmenter and through it. Preferably the vanes should not protrude into the flared end further than the tip diameter of the propeller so as not to influence the jet stream of the propeller when reversed.

In the case of propellers which are pivoted on the hull of the vessel, such as rotatable podded propulsion devices or outboard motors on small craft, no reversing provision needs to be included. In such a case, the provision of a hemi-spheroidal or conical perforated nose is sufficient to produce the desired "wake effect".

The thrust attainable from a given propeller revolution should approach that for the static or zero speed condition reduced by the form and drag resistance of the wake generator at that given speed. Such a negative thrust is substantially smaller than the augmented thrust due to the wake effect.

In order that the invention may be better understood, it will now be described with reference to one particular embodiment and with reference to the accompanying drawings. It will be appreciated that the invention is not intended to be limited to the particular embodiment described.

Figure 1:
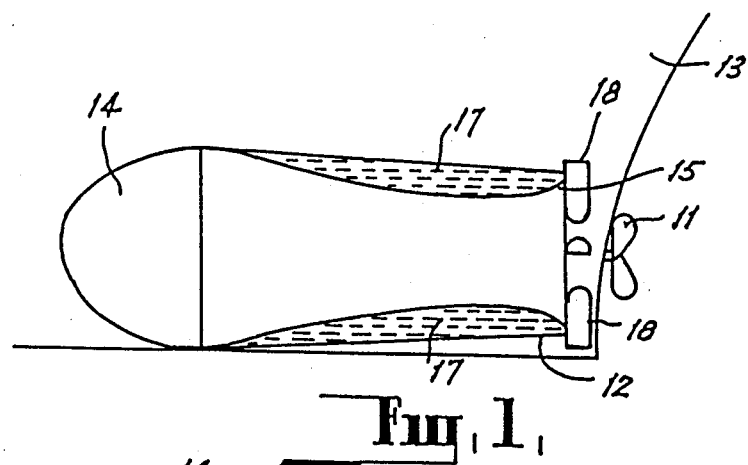
FIG. 1 is a diagrammatical sectional elevation of the augmenter of the first embodiment.
Figure 2:
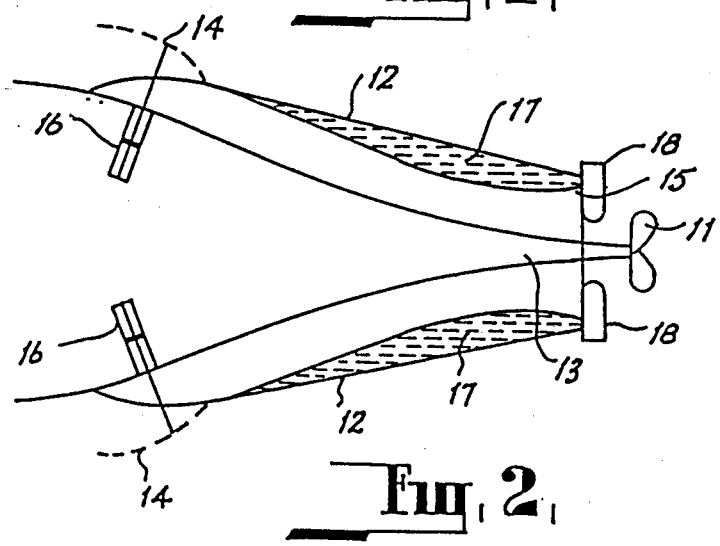
FIG. 2 is a diagrammatical sectional plan of the augmenter.
Figure 3:
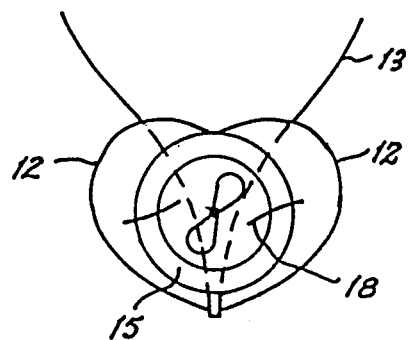
FIG. 3 is a diagrammatical end elevation of the augmenter.

The thrust augmenter according to the first embodiment shown in FIGS. 1, 2 and 3 has a propeller 11 located rearwardly of a substantially cylindrical but annular hollow body 12 mounted to the hull 13 of a vessel. The body 12 is partially closed at the forward end by a hemispherical type gate 14. The rear end of the body 12 is formed with a flared opening 15 through divergences of the inner wall towards the outer wall. During forward motion of the body when the propeller is discharging rearwards the water, passes rearwards virtually both through and around the body, and forms a wake resulting in the water reaching the propeller 11 being slowed with respect to it.

In the event of propeller reversal the jet stream from the propeller 11 draws in extra fluid across the flared opening 15 of the body 12 and the resultant flow passes through the body 12 when the gate 14 is open. The resultant reduced pressure in the flared opening 15 adds to the rearward thrust obtained by the reversing propeller 11.

With normal operation the "wake factor" in addition to the propeller momentum given to the fluid exceeds the form and friction drag of the gate 14 and the outside periphery of the body 12. The spacing of the propeller 11 from the end of the flared opening 15 will depend mainly upon its diameter.

As shown in FIGS. 2 and 3, due to the shape of the hull 13 of the vessel in the region of the propeller the body 12 is formed in two halves with one half to each side of the vessel in front of the propeller and with their cross-sectional areas equal and enlarging slightly to the front. The gate 14 is almost parallel to the axis of the vessel when closed and so its form drag is minimum. The outside periphery of the combined halves of the body 12 will vary in shape from the gate 14 to the rearward extremity where they will be cylindrical in the region of the flared opening 15.

When a vessel is to be forced to one side or the other during a reverse rotation of the propeller 11, one or other of the gates 14 may be opened and the other closed. In the case of a two propeller propulsion, each with its own wake augmenter, either unit can be used to effect side motion when the propeller 11 a reversed.

Stopping of a vessel and manoeuvring during this operation is enhanced by the wake augmenter. The additional reverse thrust from the flared opening 15 plus the concentrated flow through the body 12 make for more efficient momentum exchange of the propeller 11. By closing one of the gates 14 steering can be accomplished much better than by a rudder which is usually non-effective during propeller reversal.

The gates could be operated by large pistons 16 in a cylinder driven by high pressure oil or similar mechanism.

The cavity 17 formed by the annular walls of the body 12 can be filled with oil to prevent corrosion and provide some buoyancy to counteract the extra weight of the augmenter.

If desired, vanes 18 can be introduced around the periphery of the flared opening 15 which are twisted in the opposite direction to the rotation of the propeller 11. This results in more efficient propulsion as it reduces the vorticity of the flow from the propeller which absorbs energy.

It should be appreciated that the scope of the present invention need not be limited to the present scope of the invention.

The claims defining the invention are as follows:

1. A thrust augmenter for a propeller fluid drive for generating a more uniform wake just forward of the propeller such that wake water reaching the propeller is moving forward at almost the same speed as the vessel and the velocity of water arriving at the propeller is evenly distributed over its orbit, said thrust augmenter comprising:
   a hollow body,
   said hollow body having a forward opening and a rearward opening,
   said rearward opening being flared along a longitudinal axis of said body, said rearward opening being located closely adjacent and ahead of the propeller, the spacing between the rearward opening of said body and the propeller being a fraction of the propeller diameter, and said rearward opening of said body having an outside diameter being larger than the diameter of the propeller,
   said hollow body having an inner wall, at least a portion of the inner wall of said body having a diameter significantly less than an outside diameter of said body and an outer end of the inner wall diverging outwardly to define said flared rearward opening of said body, and
   gate means mounted on said body, said gate means being movable for varying the degree of opening of the forward opening of said body between a closed first position to prevent flow through said body and a second open position to allow flow through said body, said gate means being movable between said first and second positions so as to provide said uniform wake for different vessel speeds.

2. A thrust augmenter as claimed at claim 1 wherein the forward end of the body is streamlined.

3. A thrust augmenter as claimed at claim 1 wherein said body is mounted to the hull of a vessel and forms a part of the hull surface.

4. A thrust augmenter as claimed at claim 3 wherein the propeller extends rearwardly from a keel structure of the vessel and said thrust augmenter comprises one or more portions fixed to said keel structure.

5. A thrust augmenter as claimed at claim 4 wherein the forward end of each portion is formed with said forward opening on each side of the keel and said gate means includes hinged gates associated with a drive means for varying the degree of opening of said gates, said gates being openable outwards and being inclined to the hull to reduce forward form drag.

6. A thrust augmenter as claimed at claim 5 wherein said drive means comprises a fluid activated cylinder mounted to the keel and having its piston connected to the gates by a shaft.

7. A thrust augmenter as claimed at claim 1 wherein radial vanes are mounted to the periphery of the rearward opening to direct water flowing into the space between the body and propeller in a direction opposite to the propeller rotation during forward motion of the vessel.

* * * * *